United States Patent Office.

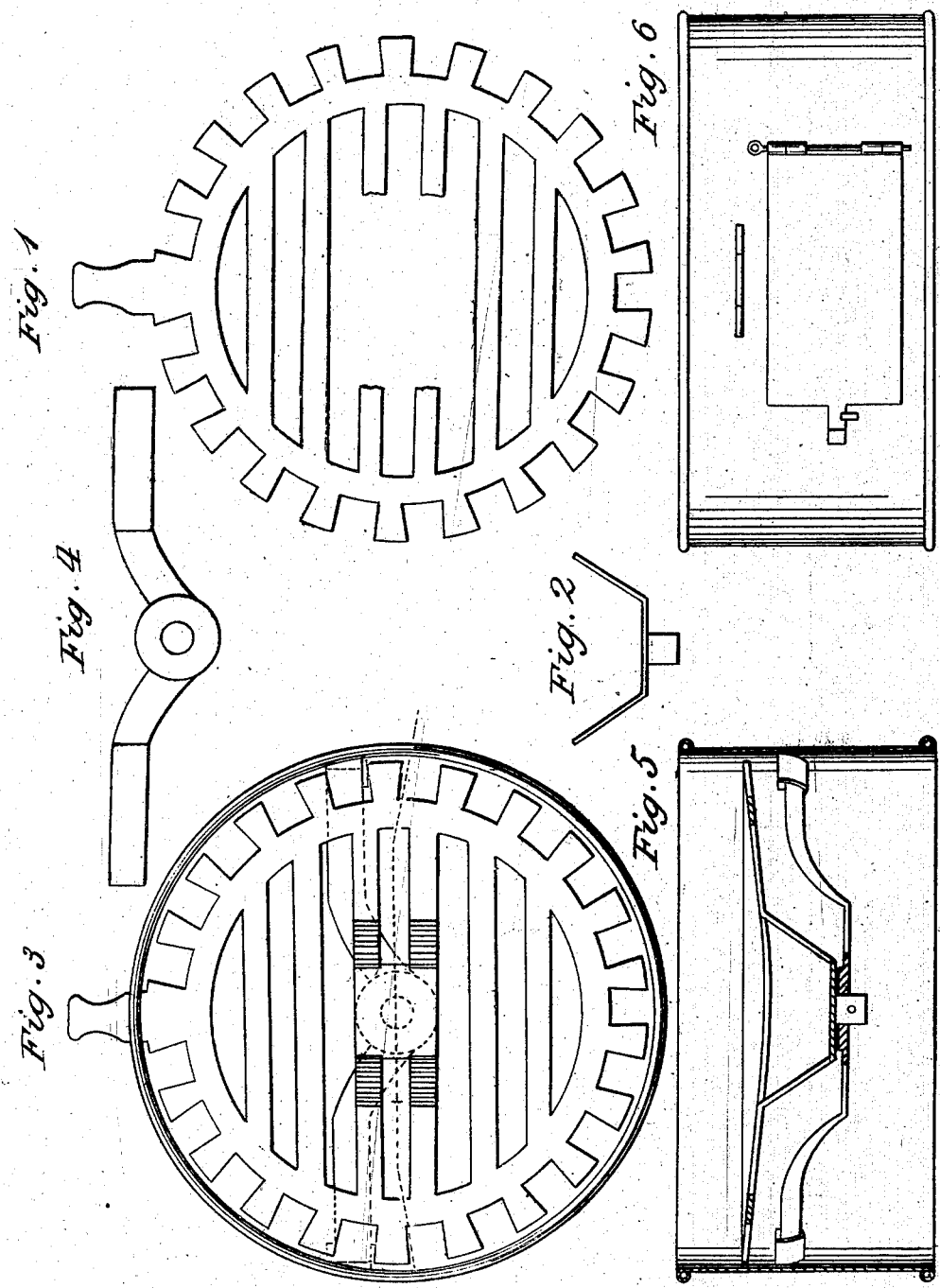

JAMES C. COCHRANE, OF ROCHESTER, NEW YORK.

Letters Patent No. 62,316, dated February 26, 1867.

---

IMPROVEMENT IN GRATES.

---

The Schedule referred to in these Letters Patent and making part of the same.

---

TO ALL WHOM IT MAY CONCERN:

Be it known that I, JAMES C. COCHRANE, of the city of Rochester, county of Monroe, and State of New York, have invented a new and useful Improvement in Grates for Furnaces and Stoves; and I do hereby declare that the following is a full, clear, and exact description of the construction and operation of the same, reference being had to the annexed drawing, making a part of this specification.

1. I construct a grate with the upper surface slightly inclining downward from the circumference toward the centre, as shown in Figure 5.

2. In the centre of the grate, and extending below it, I construct a coffer, made as represented in Figure 2, open at the top and on the sides, and closed with bars at the bottom and on the sides, the upper surface of the bottom inclining downward from front to rear. From the under surface a pin extends to fit in a socket of the yoke, hereafter mentioned. The grate, with the coffer, is shown in Figures 3 and 5, and a front elevation of the fire-pot in Figure 6.

3. I construct a depressed yoke, as shown in Figure 4, to extend across and hang in lugs at the bottom of the fire-pot, for the coffer to rest upon, and so that the grate may be vibrated or shaken from right to left, and from left to right, and also dumped by pushing down in front, as shown in fig. 5. The yoke has a socket in the centre, to receive the pin of the coffer, as shown in fig. 4.

By this improvement two objects are accomplished:

1. The air is admitted to the centre of the fire, through the coffer, horizontally as well as vertically.

2. When the grate is shaken by a horizontal rotary motion the slate, ashes, &c., are brought from the circumference toward the centre, and fall into the coffer, from which they may be readily pushed into the ash-pit with a poker, and thus avoid the necessity of dumping the grate.

What I claim as my invention, and desire to secure by Letters Patent, are the following improvements:

1. The coffer, constructed in the centre of the grate, and extending below it, substantially as and for the purposes described.

2. The combination of the coffer with the grate, substantially as described.

3. The combination of the coffer, grate, and depressed yoke, substantially as described.

JAMES C. COCHRANE.

Witnesses:
    WM. J. SHERIDAN,
    R. B. WILLIS.